March 5, 1929.  A. HAYES  1,704,320
AUTOMATIC AIR BRAKE LOCK
Filed Nov. 23, 1927   3 Sheets-Sheet 2

Inventor
Albert Hayes
By Adam E. Fisher
Attorney

Patented Mar. 5, 1929.

1,704,320

UNITED STATES PATENT OFFICE.

ALBERT HAYES, OF BERNALILLO, NEW MEXICO.

AUTOMATIC AIR-BRAKE LOCK.

Application filed November 23, 1927. Serial No. 235,166.

This invention relates to automatic air brake locks applicable to railway cars equipped with air brakes.

The main object of the invention is to provide an air brake lock which may be readily attached to any car having a conventional form of air brake and air cylinder for controlling the same, and which, when installed, will enable the engineer to lock the brakes in set position from the engine cab, or to release the brakes when so set.

Additional objects are to dispense with the operation of the usual retaining valves of the brake cylinders of cars, in descending grades; to dispense with the necessity of setting the hand brakes on cars left on sidings; to eliminate the running out of slack in the train lines on grades, to obviate the danger of leaky train lines in the manipulation of brakes on grades, and to ensure a sufficient air pressure in the train line for the control of the train on grades, before the brakes can be released.

In the drawing

Figure 4 is a detail of the slide valve mechanism mounted within the main air cylinder;

Figure 1:
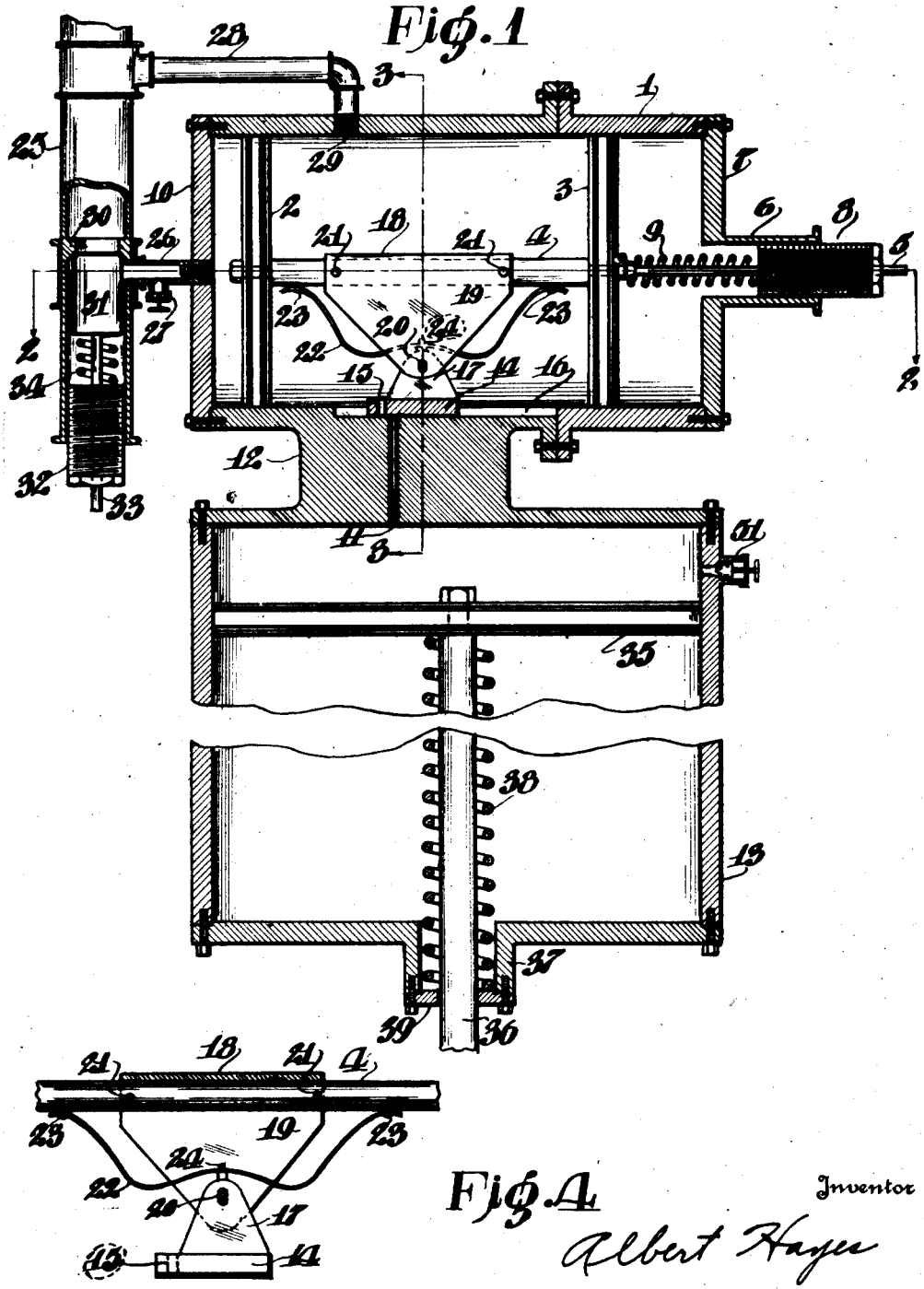
Figure 1 is a longitudinal vertical section through the assembly constituting my improved brake lock.
Figure 2:
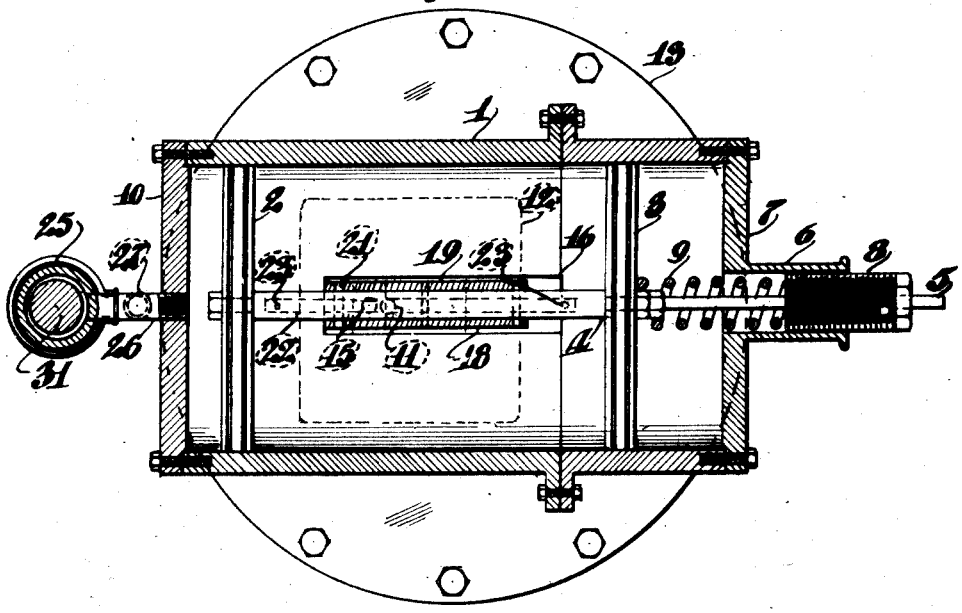
Figure 2 is a horizontal section.
Figure 3:
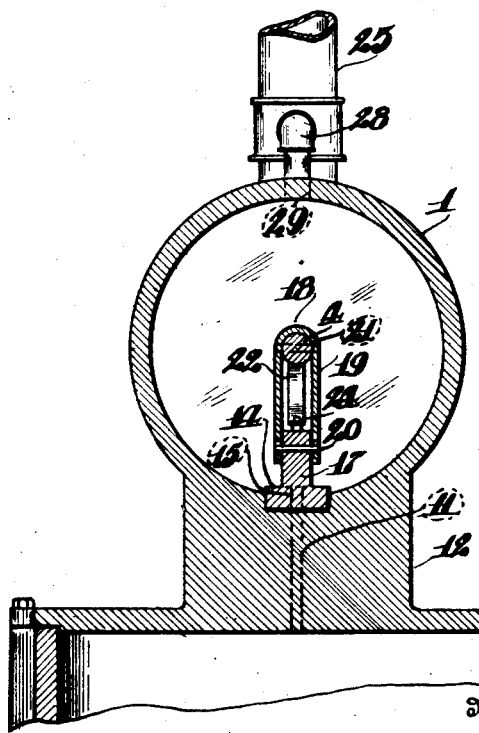
Figure 3 is a transverse section.
Figure 5:
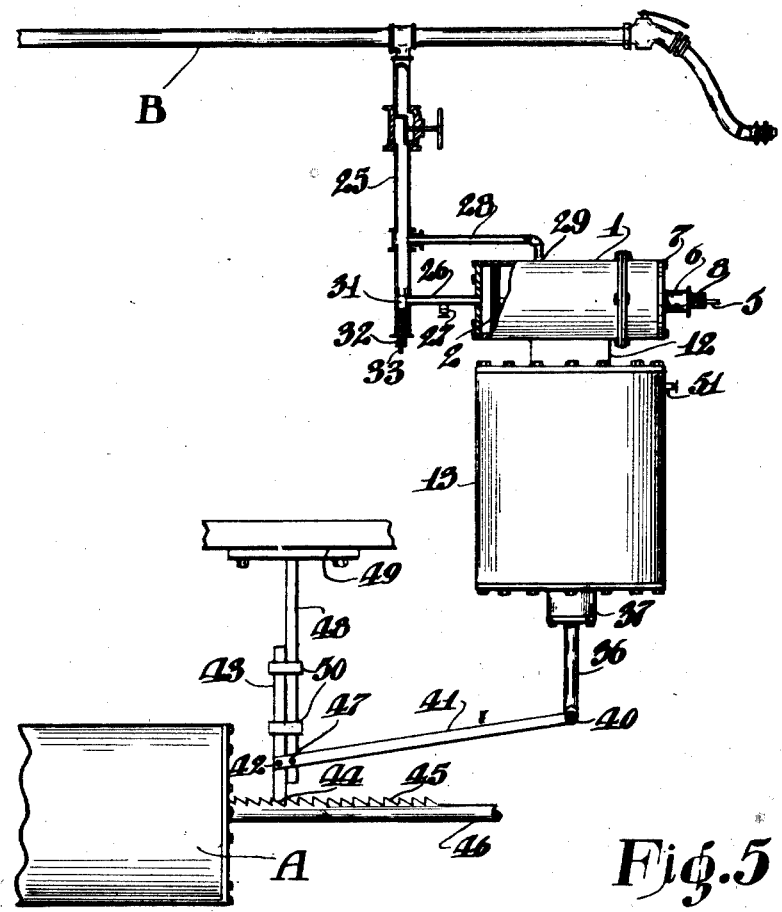
Figure 5 is an assembly view of the elements of the invention as mounted in connection with the air line and brake cylinder of a car.

My invention is designed for use in connection with the ordinary brake cylinder A and train air line B of a railroad car and cooperating brake mechanism (not shown).

In carrying out the invention I provide a main operating cylinder 1 with two spaced pistons 2 and 3 reciprocatingly mounted therein upon the connecting rod 4 which has a stem extension 5 extended out through the neck 6 and spring adjustment plug 8 incorporated in the head 7 of the cylinder 1. The neck 6 is threaded internally and so adapted to threadedly engage the exteriorly threaded, tubular adjustment plug 8. A coiled tension spring 9 is seated over the stem 5 within the cylinder 1, being braced between the piston 3 and the inner end of the plug 8. Thus the pistons 2 and 3 are thrust inwardly or towards the opposite cylinder head 10 by the spring 9, with a force depending upon the adjustment of the screw plug 8. An air port 11 leads from a point within the cylinder 1 between the two pistons 2 and 3, through the connecting block 12 and into the lower brake locking cylinder 13. A slide valve 14, having a port 15, is slidably mounted within a recessed seat 16 countersunk in the wall of the cylinder 1 immediately above the port 11, and so that at a certain point of the reciprocatory travel of the valve 14, the ports 11 and 15 will register. The valve 14 has an upstanding lug 17. A jacket 18 is incorporated around the rod 4 and the ends 19 thereof are brought down laterally over the sides of the lug 17 and are pinned loosely thereto as shown at 20. The jacket 18 is pinned to the rod 4 at the points 21. A loop spring 22 is pinned at its ends as shown at 23 to the under side of the rod 4 between the ends 19 of the jacket 18, and the central portion of this spring is fastened at 24 to the top of the lug 17. Thus the rod 4 carries the valve 14 with it in its movements, and the spring 22 holds the valve tightly seated within its seat 16.

Depending from the air line B is the relatively large pipe 25; and the small pipe 26 with a bleeder valve 27 connects the cylinder 1 through the head 10 with the pipe 25. An extension 28 from the pipe 25 is led into the cylinder 1 at the point 29, between the pistons 2 and 3. An annular valve seat 30 is formed within the pipe 25 immediately above the point of entrance of the pipe 26, and a poppet valve 31 is fitted within the lower portion of the pipe 25 and is adapted to seat itself upwardly against the seat 30. The lower end of the pipe 25 is threaded interiorly and the threaded tubular adjustment plug 32 is fitted therein. A guide stem 33 is extended from the valve 31 down through the plug 32, and a coiled tension spring 34 is seated over the stem 33 and braced between the lower end of the valve 31 and the upper end of the plug 32, thereby holding the valve 31 up against its seat under an adjustable spring pressure. When the valve 31 is seated, it of course excludes air from passing under pressure through the pipe 26, but when unseated, compressed air may pass through this pipe, and bearing upon the face of the piston 2, will force that piston and the piston 3 towards the head 7 of the cylinder 1, against the action of the spring 9. Within the brake locking cylinder 13 is mounted the piston 35 with its rod 36 extended down through the neck 37. A coiled tension spring 38 is seated over the rod 36 within the cylinder 13 and is braced between the piston 35 and the gland 39 which closes the neck 37. The lower end of the rod 36 is pivoted at 40 to the end of a latch operating lever 41, while the opposite end of said lever is pivoted at 42 to the latch 43, the beveled end 44 of which engages the rack 45 formed along the brake rod 46 of the conventional brake cylinder A. The lever 41 is fulcrumed at 47 to a bracket 48 extended from the car frame 49. Loops 50 extended from the bracket 48 around the latch 43, serve to slidably retain the said latch in position. The cylinder 13 is provided with a bleeder valve 51 near its top.

In use and operation the spring 34, below the valve 31, is adjusted through the plug 32 to sustain an air pressure of seventy-two pounds upon the valve 31, this being two pounds more than the standard train pressure of seventy pounds. The air brake is set in usual manner by admitting compressed air into the brake cylinder A, which thrusts out the rod 46 which is locked in its outthrust position by the latch 43 engaging the rack 45. By the same action the piston 35 is locked in set position. The upper portion of the pipe 25 and the space between the two pistons 2 and 3 at all times carry the normal train line pressure of seventy pounds. The brake is released by increasing the train line pressure to a point beyond seventy-two pounds, whereupon the valve 31 is forced down, thereby opening the pipe 26 and allowing more highly compressed air to flow into the cylinder 1 between the head 10 and the piston 2. This forces the pistons 2 and 3, as well as the slide valve 14, over towards the head 7, and when the port 15 of the valve 14 aligns itself with the port 11, the highly compressed air flows through said port down into the cylinder 13, forces the piston 35 downwardly and actuates the lever 41 to raise the latch 43 and thus release the brake controlled through the cylinder A, the mechanism of which is of conventional form and is, therefore, not here shown in detail.

When the engineer sets the brakes and desires to leave them locked, he moves his brake valve handle back to "running" or "holding" position, and in such positions the train line will not overcharge with air pressure, the excess air pressure will escape through the usual valves, and the latch 43 will hold the brakes set. When the engineer desires to release the brake, he moves his brake valve handle to "full release position" and in this position the main reservoir pressure (about ninety-pounds) is thrown into the train line, thereby overcharging it and forcing the valve 31 with the result before described.

When the engineer moves the brake valve handle back to "running" position, the valve 31 closes and the highly compressed air between the said valve and the piston 2 escapes through the bleeder valve 27 which is left open. Then the spring 9 forces the pistons 2 and 3 and the valve 14 back towards the head 10, thus closing the ports 11 and 15. The compressed air in cylinder 13 escapes through the bleeder valve 51, thus allowing the spring 38 to force the piston 35 upwardly for the operation of the lever 41 and releasing of the latch 43.

In case the brake is set and locked, if necessary the brake can be released by a hand lever from either side of the car.

While I have here described and shown a specific embodiment of my invention, the minor details of construction may be varied within the scope of the appended claims.

I claim:

1. In air brake mechanism and in combination with the air line, brake cylinder mechanism and brake rod of a car, an operating cylinder and the brake locking cylinder connected by an air duct entering the operating cylinder through the side wall thereof, the operating cylinder being formed with a slide valve seat at the point of entrance of the air duct, two pistons mounted in the operating cylinder in spaced relation upon a connecting rod, a slide valve seated in the slide valve seat of the operating cylinder and connected with the said piston connecting rod so as to move therewith, the said slide valve having a port adapted to register with the said connecting air duct of the two cylinders, a pipe extended from the train line across an end of the operating cylinder, an adjustable poppet valve in the open end of the said extension, a pipe with bleeder valve connecting the said extended pipe at the poppet valve with the adjacent end of the operating cylinder, a pipe communicating with the train line and entering the operating cylinder at a point between the two pistons thereof, resilient means for normally forcing the two pistons and slide valve of the operating cylinder over towards the cylinder head through which the said bleeder valved connecting pipe opens and so as to close the said communicating air duct, a piston in the said brake locking cylinder, a rod extended from the said piston out through an end of the brake locking cylinder, and releasable locking mechanism connecting the said rod with the brake rod of the said brake cylinder.

2. In air brake mechanism and in combination with the air line, brake cylinder and brake rod of a car, an operating and a brake locking cylinder connected with an air duct, a connecting rod within the operating cylinder, two pistons in spaced relation upon the connecting rod and spanning the point of entrance of the said air duct of the two cylinders, a slide valve over the said point of entrance of the air duct into the operating cylinder, the said valve being connected with the said connecting rod to travel therewith and having a port adapted to register with the air duct at a point of travel of the valve, an extension from the air line into the operating cylinder intermediate the two pistons thereof, an extension from the air line into one end of the operating cylinder, a pressure valve controlling the flow of air from the air line through the extension leading into the end of the operating cylinder, a piston and piston rod within the said brake locking cylinder, mechanism operatively connecting the extended end of the said piston rod with the said brake rod of the brake cylinder, and resilient means for normally holding the pistons of the said cylinders in their inoperative positions.

3. In air brake mechanism and in combination with the air line and brake cylinder of a car, an operating cylinder having an air port through one side and communicating with the train line through another side and at one end, two pistons mounted in spaced relation upon a connecting rod within the cylinder, the said pistons spanning the said air port and air line communication through the side walls, a valve resiliently mounted to control the flow of air from the train line through the communication leading into the end of the cylinder, the said valve being adapted to yield under supernormal air pressure from the train line to admit air into the end of the cylinder, a slide valve seated over the air port through the cylinder wall and moving with the said pistons and connecting rod to open or close said port, and mechanism extended between the said air port of the operating cylinder and the said brake cylinder, the said mechanism being adapted to control the said brake cylinder and being controlled in its turn by the flow of air through the said air port of the operating cylinder.

In testimony whereof I affix my signature.

ALBERT HAYES.